US009342804B2

(12) United States Patent
Dufosse et al.

(10) Patent No.: US 9,342,804 B2
(45) Date of Patent: May 17, 2016

(54) CENTRALIZED WORK FLOW MONITORING (75) Inventors: Eric Denis Dufosse, Portland, OR (US); Northon Rodrigues, Oregon City, OR (US); Travis Lee Spencer, Beaverton, OR (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 713 days.

(21) Appl. No.: 12/450,696

(22) PCT Filed: Apr. 8, 2008

(86) PCT No.: PCT/US2008/004539
§ 371 (c)(1),
(2), (4) Date: Oct. 7, 2009

(87) PCT Pub. No.: WO2008/127589
PCT Pub. Date: Oct. 23, 2008

(65) Prior Publication Data
US 2010/0050105 A1 Feb. 25, 2010

Related U.S. Application Data

(60) Provisional application No. 60/923,010, filed on Apr. 12, 2007.

(51) Int. Cl.
*G06F 3/00* (2006.01)
*G06Q 10/06* (2012.01)
*G06F 3/048* (2013.01)
*H04L 12/24* (2006.01)

(52) U.S. Cl.
CPC ............... *G06Q 10/06* (2013.01); *G06F 3/048* (2013.01); *H04L 41/0213* (2013.01)

(58) Field of Classification Search
CPC ...... G06F 13/22; G06F 9/30094; G06F 11/16; G06F 11/22; G06F 11/2236; G06F 3/048
USPC .................................................. 715/771, 733
See application file for complete search history.

(56) References Cited

U.S. PATENT DOCUMENTS 6,338,074 B1* 1/2002 Poindexter et al. ........... 715/234
7,171,664 B2* 1/2007 Wang et al. .................... 718/100
(Continued)

FOREIGN PATENT DOCUMENTS

JP      11134306 A      5/1999
JP      2004355265 A    12/2004
(Continued)

OTHER PUBLICATIONS

Castle Rock Computing, "SNMPc OnLine," date unknown, Internet citation: http://www.castlerock.com/products/online/default.php one page.

(Continued)

*Primary Examiner* — Kieu Vu
*Assistant Examiner* — Andrew Chung
(74) *Attorney, Agent, or Firm* — Arent Fox LLP (57) ABSTRACT

Centralized monitoring of a system, such as a content management system is performed by a monitoring apparatus that stores status information from elements in the system by element according the status information severity. The monitoring apparatus processes the status information for each element in the order of severity by applying at least one user-specified rule to determine whether to generate an alert for such information.

20 Claims, 7 Drawing Sheets

(56) References Cited

U.S. PATENT DOCUMENTS

| | | | |
|---|---|---|---|
| 7,672,968 B2* | 3/2010 | Bradateanu et al. | 707/807 |
| 7,739,374 B1* | 6/2010 | Frey et al. | 709/224 |
| 8,144,587 B2* | 3/2012 | Heinz et al. | 370/235 |
| 2002/0123864 A1 | 9/2002 | Eryurek | |
| 2003/0033179 A1 | 2/2003 | Katz et al. | |
| 2003/0221005 A1* | 11/2003 | Betge-Brezetz et al. | 709/224 |
| 2004/0139449 A1* | 7/2004 | Hope et al. | 719/318 |
| 2005/0131762 A1* | 6/2005 | Bharat et al. | 705/14 |
| 2006/0047800 A1* | 3/2006 | Caveney et al. | 709/223 |
| 2007/0113184 A1* | 5/2007 | Haot et al. | 715/723 |
| 2008/0140448 A1* | 6/2008 | Hernandez et al. | 705/2 |
| 2008/0267182 A1* | 10/2008 | Smiljanic | 370/390 |
| 2009/0043867 A1* | 2/2009 | Sharp et al. | 709/218 |

FOREIGN PATENT DOCUMENTS

| | | |
|---|---|---|
| JP | 2005167377 A | 6/2005 |
| JP | 2005208707 A | 8/2005 |
| JP | 2005322024 A | 11/2005 |
| JP | 2006252460 A | 9/2006 |
| WO | 2006039357 A1 | 4/2006 |

OTHER PUBLICATIONS

Managed Methods, "Alerts," JaxView User Guide, date unknown, Internet citation: http://www.managedmethods.com/userguide/docs/AlertsTab.htm pp. 1-5.

Wikipedia, "Simple Network Management Protocol," Jun. 27, 2007, pp. 1-10.

International Search Report, dated Jul. 4, 2008.

Chinese Office Action in Chinese Application No. 200880011794.4 mailed Sep. 21, 2011.

Chinese Office Action in Chinese Application No. 200880011794.4 mailed Mar. 1, 2012.

Chinese Office Action in Chinese Application No. 200880011794.4 mailed Jul. 26, 2012.

No author name supplied in Source Data: "Storage Management in a Video Content Management System," IP.COM Journal, IP.Com Inc., West Henrietta, NY, Feb. 27, 2004, XP013014497, ISSN: 1533-0001. (This reference was cited in Summons to Attend Oral Proceedings dated Jun. 21, 2013 regarding EP Application No. 08742653.2.).

Jun. 21, 2013 Summons to Attend Oral Hearing and attachment regarding EP Application No. 08742653.2.

International Preliminary Report on Patentability and Written Opinion dated Jul. 4, 2008 regarding EP Application No. 08742653.2.

Notice of Reasons for Rejection dated Oct. 16, 2012 re Japanese Patent Application No. 2010-503038.

Notification of Reasons for Refusal dated Mar. 26, 2013 re Japanese Patent Application No. 2010-503038.

First Office Action regarding China Patent Application No. 200880011794.4 dated Oct. 3, 2011.

Office Action dated Jul. 8, 2015, regarding Canadian Application No. 2,682,954.

* cited by examiner

NetCentral Reports

| Type: | Site: ▷ | Device Name | Device type | Value |
|---|---|---|---|---|
| Report Item: | Critical Messages ▷ | grass-yj6o2vddv | Brocade SilkWorm | 0.2054 |
| Number of Results: | | bagnsdceu01.eu.thmulti.com | Brocade SilkWorm 3200 | 0.1834 |
| ● All | | satheesh-xp | Brocade SilkWorm | 0.081626 |
| ○ Top | 10 | neriak.am.thmluti.com | Camera | 0.002395 |
| ○ Bottom | 10 | bvtnd-balasuk.am.thmulti.com | Harris Flexicoder | 0.0015 |
| Include Results: | | gv036655 | Harris Flexicoder | 0.0015 |
| From: | Beginning ▷ | bvtnd-netcenral.grassvalleygroup.com | Kalypso Frame | 0.0015 |
| To: | Now ▷ | gvmx-d51 | Windows System | 0.0015 |
| Format: | Acrobat(PDF) ▷ | bvtnl-clauncj.am.thmulti.com | XtenDDFrame | 0.001444 |
| | | bvtnl-bretlm.am.thmulti.com | Harris Flexicoder | 0.001423 |
| Create | | grass-vj6o2vddv | Modular Frame | 0.001394 |
| | | bvtnd-tendolm.grassvalleygroup.com | Brocade SilkWorm 3200 | 0.001393 |
| | | neriak.am.thmluti.com | Camera | 0.001367 |
| | | bvtnd.boylesd.am.thmluti.com | Brocade SilkWorm 3200 | 0.001357 |

CENTRALIZED WORK FLOW MONITORING

CROSS-REFERENCE TO RELATED APPLICATIONS

This application claims the benefit, under 35 U.S.C. §365 of International Application PCT/US2008/004539 filed Apr. 8, 2008, which was published in accordance with PCT Article 21(2) on Oct. 23, 2008 in English and which claims the benefit of U.S. provisional patent application No. 60/923,010 filed Apr. 12, 2007.

TECHNICAL FIELD

This invention relates to a technique for managing status information gathered from multiple sources.

BACKGROUND ART

Entities, such as broadcasters that receive, process and/or distribute content, in the form of electronic files containing audio-visual programs, typically make use of large systems for managing such content. Such large systems invariably possess the ability to monitor various operations associated with the receipt, processing and/or distribution of content. For ease of discussion, the combination of such operations will be referred as content workflow. In practice, the monitoring of content workflow results in the generation of status information, which can comprise log files and/or status messages. Depending on the number of operations associated with the cotent work flow and the volume of content received, content management systems can generate a large amount of status information. Some status information will require immediate attention by a human operator, while other status information might not require much if any attention.

The logging tools associated with present day content management systems offer little capability to view, sort and/or filter status information in a time-ordered fashion from multiple elements, comprising hardware and/or software components for carrying out content workflow. The larger the amount of status information, the more apparent this problem becomes. The logging tools of present day content management system incur another problem by virtue of their inability to convert generic log information contained in an operational alarm into relevant information upon which an operator can react as appropriate. This remains the most critical issue with the monitoring of elements and the associated filtering and notification of alarms since managed elements tend to send a huge number of false positives, causing operators to spend time chasing non relevant events.

Present day logging tools typically lack the ability to create system dashboards, i.e., visual displays of operating conditions, and the ability to generate reports. Given the large amount of status information typically generated by present-day content management systems, the operators need reports on relevant activities as well as periodic updates. The techniques that exist in present day content management systems methods for generating reports, and for creating dashboards for viewing remain inadequate in the context of a broadcast environment because of such techniques lack both functionality and flexibility.

Another disadvantage of such logging tools is their inability to perform efficient message suppression. In practice, a monitoring system that includes message logging will generate a message at regular intervals as long as the condition prompting the message remains. Such repeated messages can prove useful in the event of emergency condition. However, for many ordinary conditions, such as the completion of a particular activity, repeating a message indicative of such a condition proves wasteful. This problem plagues most monitoring applications, causing an enormous amount of data sorting and wasteful storage.

Present day content management systems also suffer from an inability to track assets within a facility. Today's content management system can move large volumes of digital assets throughout a facility but lack any standard mechanism to view and measure the quality of a digital asset at multiple locations within that facility. The lack of such a standard mechanism for viewing and measuring the quality of an asset at a given location can prevent the mixing and matching of different pieces of equipment from multiple vendors.

BRIEF SUMMARY OF THE PRESENT PRINCIPLES

Briefly, in accordance with a preferred embodiment of the present principles, there is provided a method for managing status information received from elements in a system, such as a network or the like. The method commences by storing such status information from the elements according to the nature of the element and the status information severity. The status information is retrieved and thereafter processed in the order of severity for each element by applying at least one user-specified rule to determine whether to generate an alert for such information.

DETAILED DESCRIPTION

Figure 1:
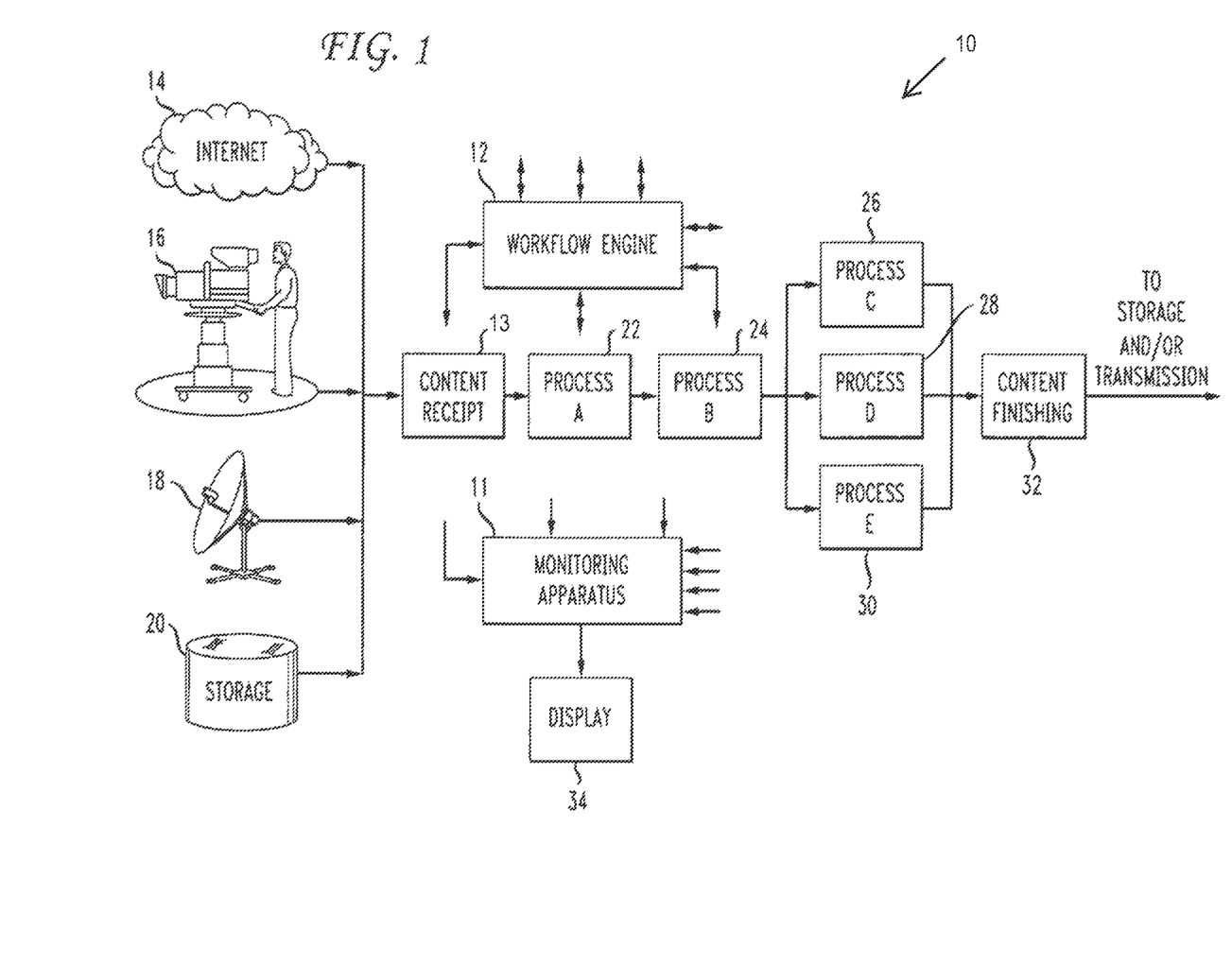
FIG. 1 depicts a block schematic diagram of an exemplary embodiment of a content management system that incorporates a monitoring apparatus for managing status information in accordance with the present principles.

FIG. 1 depicts a block schematic diagram of an exemplary embodiment of a content management system 10 that includes a monitoring apparatus 11, described in greater detail below, for managing status information received from the content management system in accordance with the present principles. The content management system 10 typically includes a plurality of individual elements, all operating under the control of a work flow manager 12. Each element takes the form of one or more hardware devices and/or one or more software program(s) for performing at least one task associated with at least one of the receipt, processing and/or distribution of content (i.e., content work flow). In practice, the content management system 10 includes a first element 13 that serves to receive and store content from one or more sources. Such content sources can include one or more of a Content Delivery Network (CDN), represented by the Internet 14, a source of live content, represented by television camera 16, a wireless CDN, represented by satellite receiver 18, and stored content, represented by content storage facility 20.

In addition to buffering incoming content, the content receiving element 13 can perform one or more additional processes, such as decoding of the incoming content. Content initially received at the content receiving element 13 passes to a second element 22 that performs at least a first process "A" which could include for example adding certain metadata to the received content. The content processed at element 22 then passes to an element 24 which performs at least one second process "B" on the content. The second process could include editing of the content. Although FIG. 1 depicts only the elements 22 and 24 for performing two processes A and B in succession, the content management system 10 of FIG. 1 could contain more or less elements (not shown) for performing a larger or smaller number of processes in succession on incoming content.

In addition to (or in place of) the elements 22 and 24 for performing successive processes, the content management system 10 can include two or more elements for performing processes in parallel. In the illustrative embodiment of FIG. 1, the content management system 10 includes elements 26, 28, and 30, each for performing at least one of one of processes "C", "D" and "E," respectively, on the content received at the output of the element 24. Which of elements 26, 28, and 30 performs at least one of processes C, D and E, respectively, on the received content typically will depend on one or more attributes associated with the content. For example, the size of the content could govern the particular process performed. Although FIG. 1 depicts three elements 26, 28, and 30 for performing parallel processes C, D and E, respectively, the content management system could include a smaller or larger number of elements for performing a smaller or larger number of processes in parallel. A content finishing element 32 receives the content processed by each of the elements 26, 28, and 30 and typically performs one or more processes prior to content storage and/or distribution. For example, the content finishing element 32 could perform content compression.

The exact number of elements and the nature of the processes performed thereby, whether in succession and/or in parallel can vary. What remains of significance is that one or more of the elements 13 and 22-32 typically generates log files and/or status messages (collectively referred to as "status information") in the course of the content work flow. The larger the number of elements in the content management system 10, as well as the greater volume of content processed will give rise to a larger volume of status information for processing by the monitoring apparatus 11.

As described herein, the monitoring apparatus 11 of the present principles advantageously stores such status information according to the element that provided the information and the status information severity. The monitoring apparatus 11 retrieves the stores status information and thereafter processes the status information in the order of severity for each element by applying at least one user-specified rule to determine whether to generate an alert for such information. In practice, a display 34 will display such alerts, although such alerts can be provided in other ways.

Figure 2:
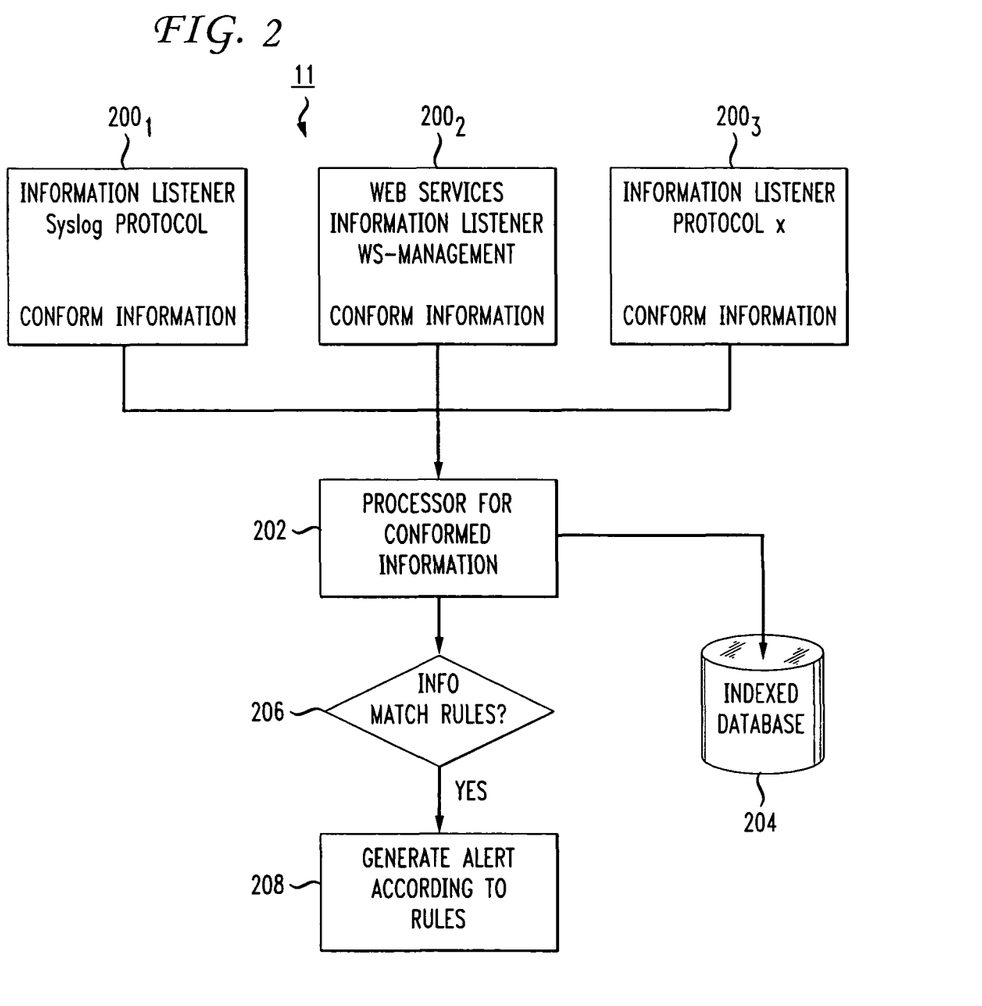
FIG. 2 depicts a block schematic diagram of the monitoring apparatus of FIG. 1.

FIG. 2 depicts a block schematic diagram of the monitoring apparatus 11 of FIG. 1. As depicted in FIG. 2, the monitoring apparatus comprises at least one, and preferably a plurality of information listeners, illustratively depicted as information listeners $200_1$, $200_2$ and $200_3$. Each of the information listeners $200_1$-$200_3$ comprises one or more hardware elements and/ or one or more software programs for receiving status information, in the form of log files and/or messages in a particular protocol or format from one or more of the elements 12 and 22-32. Each information listener conforms the status information it receives from into a common format. For example the information listener $200_1$ listens for information in the "Syslog" protocol, whereas the information listener $200_2$ listens for information carried over the World-Wide Web of the Internet in the "WS-Management" protocol. Lastly, the information listener $200_3$ listens for information in protocol "x", representing a future developed protocol. Although the illustrative embodiment of FIG. 2 depicts the three information listeners $200_1$-$200_3$, the processing monitoring apparatus 11 can include a smaller or larger number of such information listeners without departing from the present principles.

The status information conformed by each of the information listeners $200_1$-$200_3$ undergoes processing by a processor 202. In particular, the processor 202 organizes the received status information from the information listeners $200_1$-$200_3$ according to the element within the content management system 10 of FIG. 1 that provided the information and the status information severity, knowledge of which is contained in the received status information. The processor 202 stores the status information organized in this manner in an indexed database 204. Thus, by accessing the database 204, the processor 202 can thus obtain status information for a given element in the order of severity.

In practice, the database 204 not only stores the status information organized in the manner described, but also stores at least one, and preferably a plurality of user-specified rules that provide when to generate an alert for a particular status message. Rather store the user-specified rules in the database 204; a separate database (not shown) could store such rule(s).

The user-specified rule(s) provide for generating an alert upon detecting at least one predetermined condition. For example, a user-specified rule could provide that for a given element, an alert message should be generated if the element does not generate a periodic signal, sometimes referred to as a "heartbeat" signal, within a given interval, suggesting that the element has failed. As another example, for a given element, an alert should occur if the element experiences content overflow. Thus, a given user-specified rule could apply to all elements, some elements or only a single element. For a given element, a user-specified rule could mandate generating an alert regardless of the status information severity. Alternatively, a user-specified rule could mandate generating an alert only above a certain severity level.

A user-specified rule could require the presence of more than one condition to trigger an alert, as reflected by the presence of multiple status messages within the received status information. Indeed, one or more user-specified rules could make use of Boolean logic to set forth various conditions associated with one or more elements in order to trigger an alert. Indeed, a user-specified rule could trigger an alert taking into account other factors independent of the elements originating the status information and its severity. For example, the time of day, and/or day of the week could influence whether or not to generate an alert. The possible conditions that could trigger an alert in accordance with one or more user-specified rules are endless and too numerous to mention here.

The processor 202 applies the user-specified rule(s) to the stored status information in the database 204 as indicated by the decision block 206 in FIG. 2 to determine whether to generate an alert. Upon finding that the status information matches at least one rule, the processor generates an alert, as indicated by the action in block 208. As described previously, the status information residing in the database 204 is indexed by element in order of status information severity. Thus, the processor 202 generates alerts for successive elements in the order of the status information severity. In this way, an operator can view and sort log message based on device, device type, time/date, and message severity. The processor 202 makes use of pagination techniques in order to optimize the display of status information and provide fast response.

The monitoring apparatus 11 of FIGS. and 2 could communicate to a Network Operations Center (NOC) (not shown). For a given content work flow carried out by an associated content management system 10, the monitoring apparatus 11 associated with that content management system will maintain its own database for storing status information for serving that information to the NOC on demand via HTML.

As described earlier, present-day content management systems which monitor devices and filtering status message to generate alarms suffer from the problem of generating a very large number of false positives which require operators to spend time chasing non relevant events. The monitoring apparatus 11 of FIGS. 1 and 2 advantageously converts status information relevant to the operation of the content management system 10, as determined by the application of one or more user-specified rules, into an alarm. Doing so will reduce the rate of false alarms in a facility when dealing with a generic log mechanism.

The processor 202 of includes a graphics engine (not shown) that possess the ability to generate various displays, often referred to as "dashboards", to provide a display of various portions of the status information, as organized by device and status information severity. Such a graphics engine could include one or more well known software programs that possess the ability to create graphical displays of information. The graphics engine in the processor 202 allows for automatic dashboard rotation, allowing a system-wide overview of the status of various elements. If more information is desired for a specific element, simply moving a mouse over the item will yield further details. In order to create fast access to current status, for a given element, that for that element could be stored locally and served via a web page. Status information for a given element could include information associated with both software and hardware components including workflow environment settings.

Figure 3A:
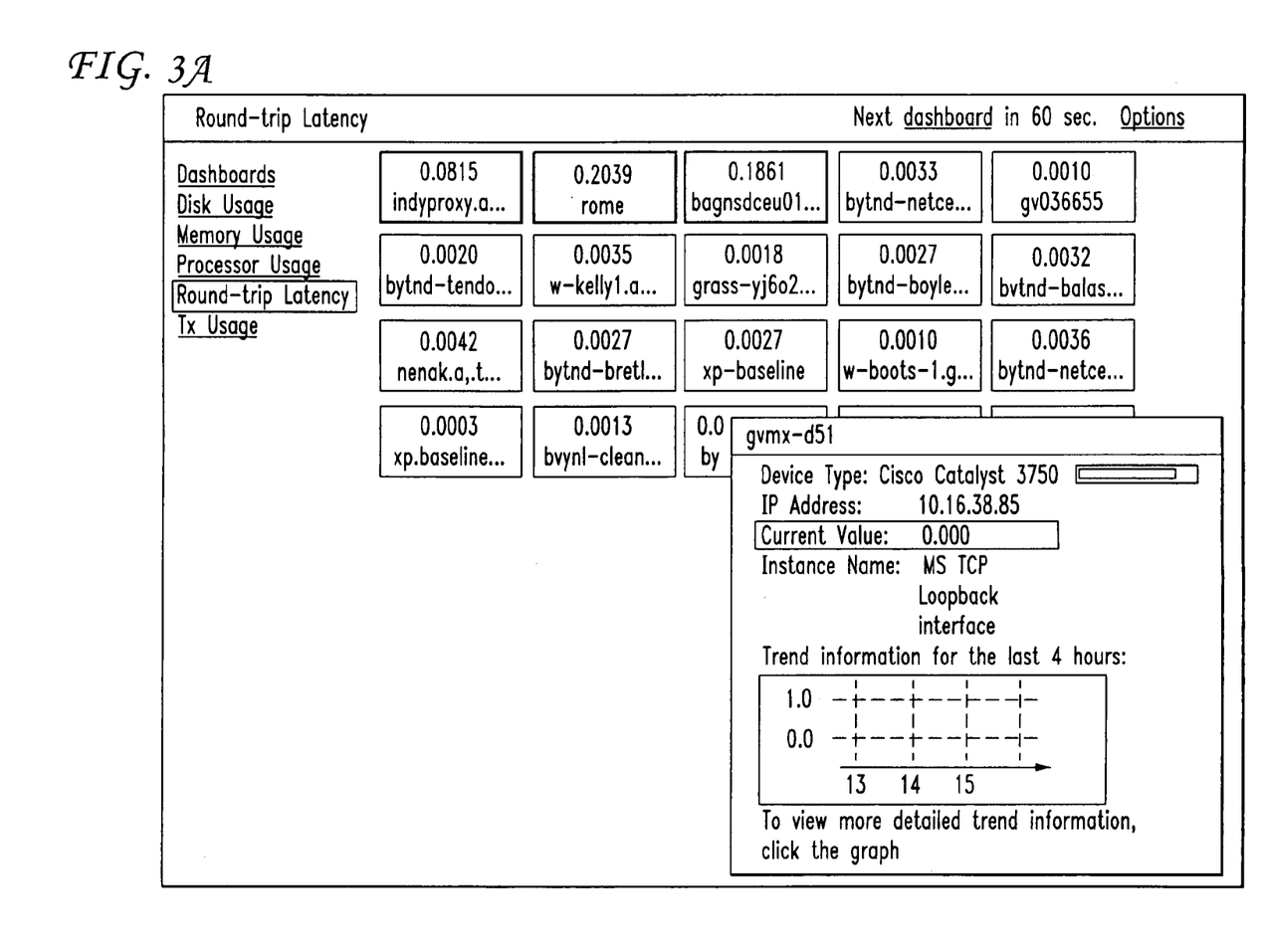
FIGS. 3A-3C depict exemplary displays of status information provided by the monitoring system of FIGS. 1 and 2.
Figure 3B:
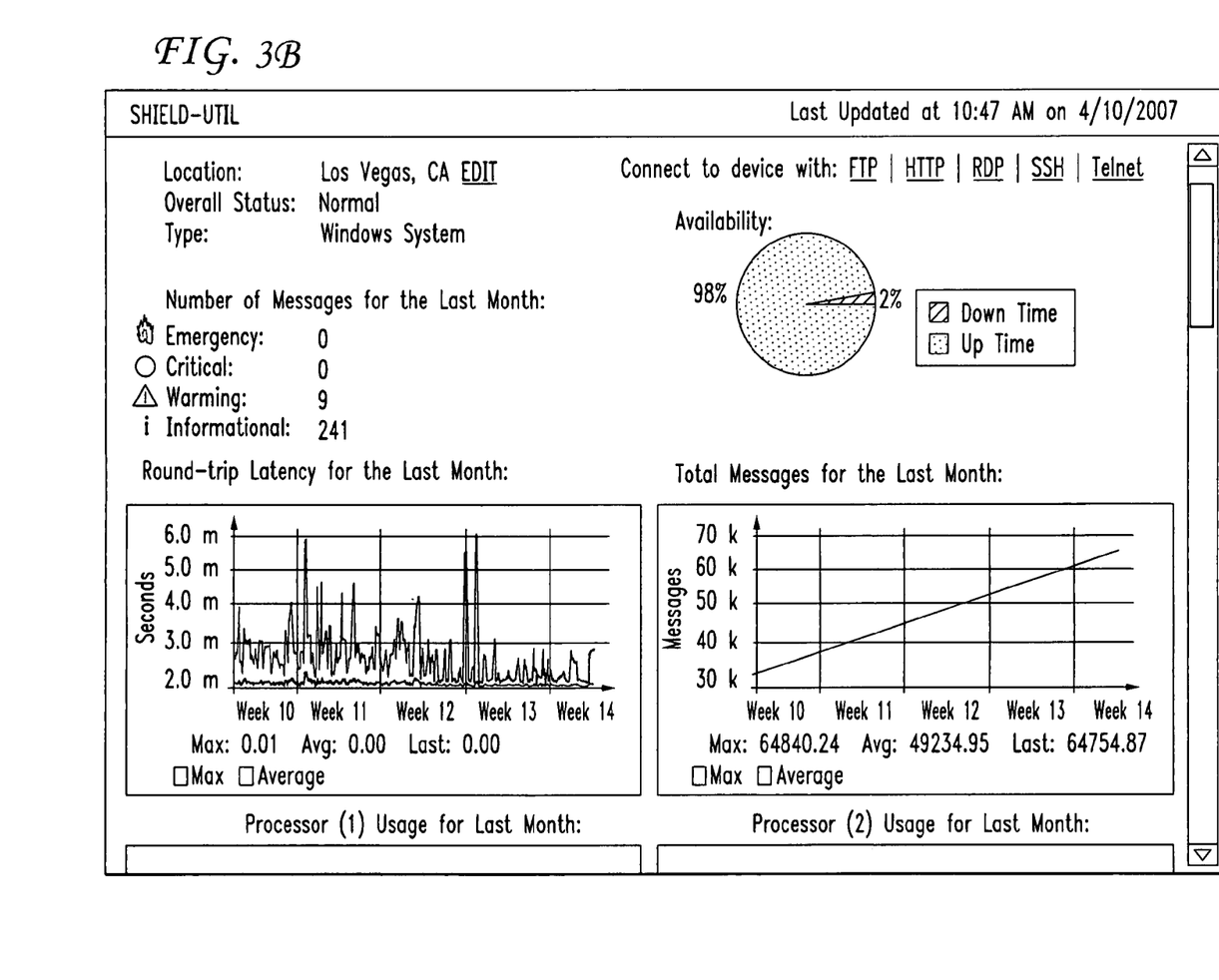
Figure 3C:
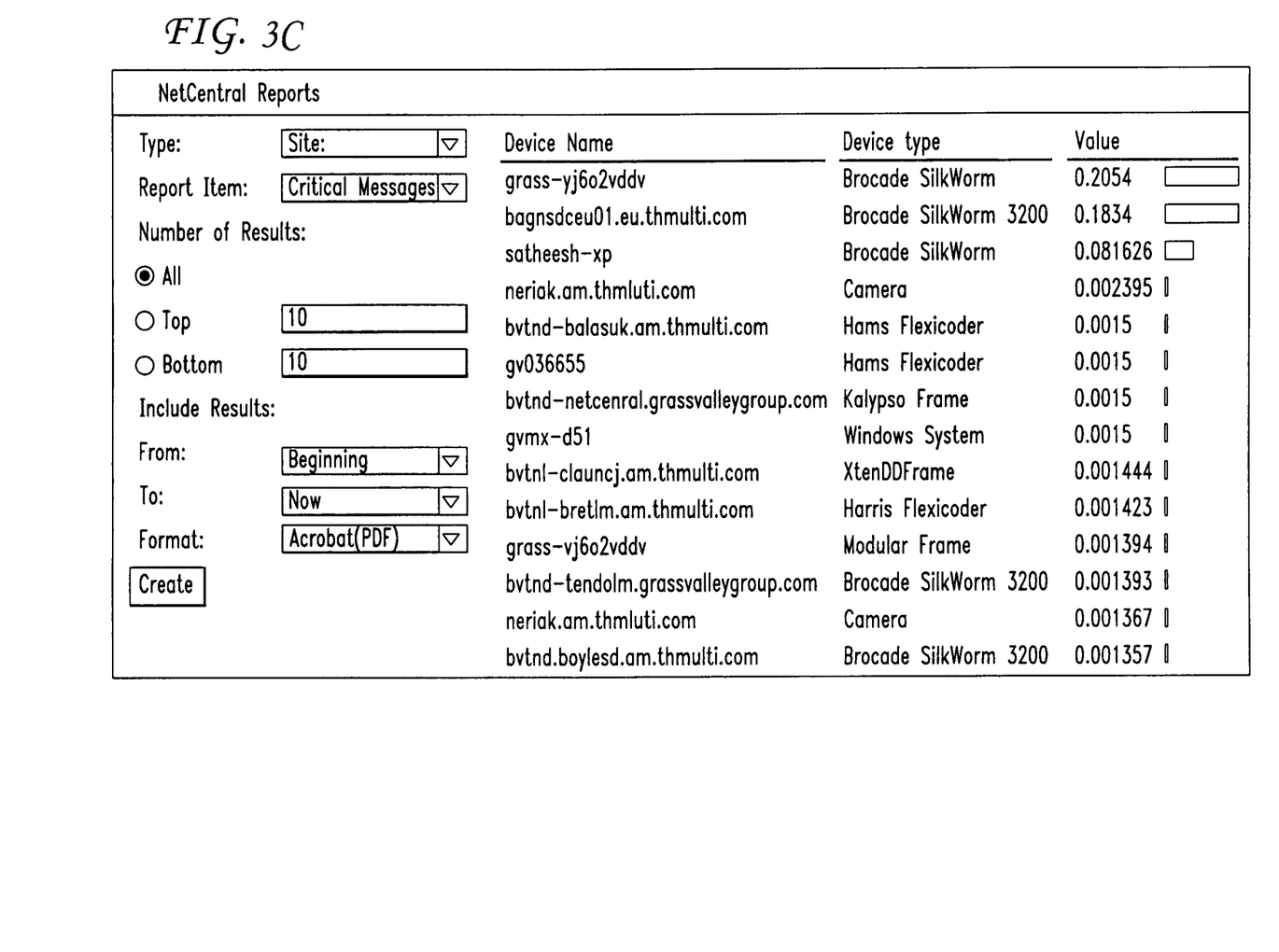

FIG. 3A depicts a first exemplary dashboard that displays round-trip latency between a given element in the content management system 10 of FIG. 1 and selected destinations. FIG. 3B depicts a second exemplary dashboard that displays historic results for a given period of time for a given content management system. FIG. 3C depicts yet another exemplary dashboard that displays critical status information for various content management system elements. Using its graphics engine, the processor 202 can provide other dashboards by extracting stored status information from the database 204 and displaying such information in multiple formats using HTML to access and create style sheets. The dashboards, such as those depicted in FIGS. 3A, 3B and 3C allow for trend analysis, enabling monitoring and evaluation of the overall operation of the content management system 10 of FIG. 1.

The processor 202 of FIG. advantageously can suppress certain status information, using a logarithmic message suppression algorithm so that a user can observe the frequency of suppressed status information. The processor 202 can suppress status information formatted using the Simple Network Management Protocol (SNMP) as well as non-SNMP formatted status information. For the sake of simplicity, only SNMP message suppression will be discussed.

Figure 4:
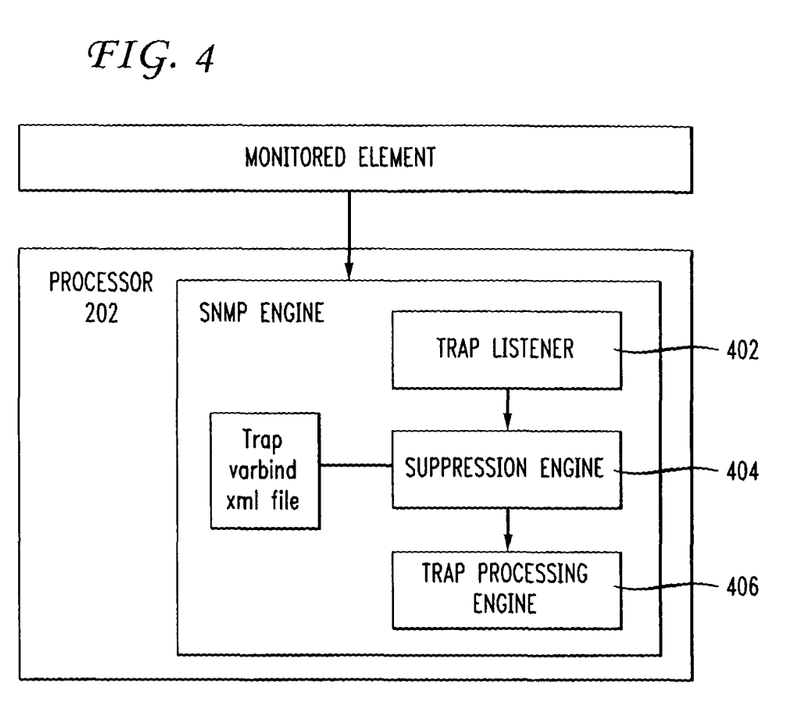
FIG. 4 depicts a block schematic diagram of a portion of the monitoring apparatus of FIG. 2 depicting the manner in which the monitoring apparatus suppresses certain status information.

FIG. 4 depicts a block schematic diagram of a SNMP engine 400 that resides within the processor 202 of FIG. 2 for performing message suppression using one or more "traps." As described hereinafter, each trap serves to filter a particular message associated with a particular condition to suppress such messages. In practice, the SNMP engine 400 comprises one or more software programs for performing suppression. However, for ease of description, these software programs will be described with respect to FIG. 4 as functional elements. The SNMP engine 400 includes at least one, and preferably, a plurality of trap listeners 402, each taking the form of an interface, associated with a particular one of the elements 12 and 22-32 for whom certain status information should be suppressed. The status obtained by each trap listener passes to a suppression engine 404 that takes the form of one or more software programs for performing suppression in the manner discussed below in accordance with one or traps established by a trap processing engine 406.

The suppression engine 404 has a hash table which stores suppression information for each trap received. Each trap received stays in the hash table for period which will depend upon the frequency of the trap.

The hash table has the following structure:

```
struct TrapKey
{
        string strDeviceIp;
        string strTrapOid;
        string strCommaSeperatedVarBindings;
}
```

The parameter "strCommaSeperatedVarBindings" constitutes the string formed by using information from the database 408, referred to as Trap varbind xml data, which are of interest to the processor 202. For example, consider the a trap for suppressing messages representing a status change in a fan (not shown) in video server, such as a Thomson Grass Valley "PVS" type server available from Thomson Grass Valley, Beaverton, Oreg. For trap "pvsFanStatusChange" (oid=1.3.6.1.4.1.4947.2.2.2.0.4) variable bindings are:

pvsLastTrapCategory (1.3.6.1.4.1.4947.2.2.2.1.4)
pvsFanStatus (1.3.6.1.4.1.4947.2.2.2.3.7.1.1)

When the above trap is received from a device whose IP is x.x.x.x, and the variable binding values as 2, the hash table key would be strDeviceIp="x.x.x.x"
strTrapOid="1.3.6.1.4.1.4947.2.2.2.0.4"
strCommaSeperatedVarBindings="1.3.6.1.4.1.4947.2.2.2.1.4=2, 1.3.6.1.4.1.4947.2.2.2.3.7.1.1=2"

Also note that parameter "strCommaSeperatedVarBindings" will only have variable bindings which are used in by the processor 202 and not the unused variable binding. To determine which all variables are useful, the processor 202 will check in the database 408 for the 'Trap Varbind xml data at the time of setup or upgrade.

If the trap OID is not found, then there will be two possibilities. If a user has opted for ignoring an unhandled trap, then the trap will be ignored. Otherwise all the variable binding sent with the trap will be used for generating the trap key.

While creating the hash table key from the variable bindings (or while searching for variable binding of the trap in Trap varabind xml file database 408, the index appended to the variable bindings should be removed. Otherwise the comparison will not succeed. When a trap is received, the processor 202 will check the hash table to determine if an entry for the trap exists.

The following data structure will store the information related to trap suppression.

```
struct TrapSuppressionData
{
    time entryTime (EntT)
    int nSuppressionInterval (SI)
    int nSuppressionCount (SC)
    int nExitTime (ET)
    HVBL hVBL
};
```

The parameter "entryTime (EntT)" constitutes the current system time at the trap is entered into the suppression table. This time will also be updated every time the suppression data is updated in table. The parameter "HVBL h VBL" constitutes a variable Bindings list. The parameter "Suppression Interval (SI)" constitutes the interval within which if the same trap is received it will be suppressed. The interval will be adjusted if the same trap is continuously received depending upon the frequency of the trap. The interval will increase in power of 2 if the same trap is received with in the aging time and after the old suppression period has expired. When the trap is received for the first time this interval is 0 seconds. If same trap is received within the aging time, the interval will be 1 second. Any trap received in within 1 second ($2^0$) will now be suppressed (as the suppression period is 1). If the same trap is received again after suppression period (1 second) has elapsed then the suppression interval will be 1 second ($2^1$) and so on so forth. Hence, the suppression interval will follow the formula $2^x$, where x is the number of seconds in which all received repeated messages will be suppressed. Any traps with in the period of $2^x$ will be suppressed.

The parameter "Suppression Count (SC)I" constitutes the number of suppressed traps for a particular suppression interval. When the suppression interval changes, the suppression count starts again from zero.

Several other parameters require calculation to complete the suppression algorithm. The parameter "Aging Time (AT)" constitutes the interval during which the trap will stay in the hash table. By default, AT will be 32 seconds from the EntTime. The default value of AT can be changed through a registry key. This also implies that 32 seconds constitutes the maximum suppression interval supported. When the trap is received for the first time, the aging time will be set to the default value (32s from the current machine time) and the trap will be added to the table. Also, the interval can be sent for further processing. Once the aging time is elapsed the trap entry will be removed from the table. If the same trap is received again while the old trap is already there in the table, the aging time will be set to EntTime+default AT+Suppression interval (SI). Any trap which is suppressed will also change the AT to EntTime+default AT+Suppression interval (SI).

The parameter "Exit Time (ET): EntT+SI" constitutes the time at which the current suppression time will expire and if any traps are suppressed at the end of this interval, the trap has to be sent for processing with the suppression count. In other words, this is the time for which a trap will be put on hold to see if the same traps are received. The trap will be forwarded for processing after the exit time with the count of suppressed traps.

Following is the example how the hash table will be changed when same trap is coming with at the interval

| Trap# | SI | SC | ET | AT | Action |
|---|---|---|---|---|---|
| 1 | 0 | 0 | EntT + 0 | EntT + 32 | Trap Processed |
| 2 | 1 ($2^0$) | 0 | EntT + 1 | EntT + 32 + 1 | Trap Processed (count = 0) |
| 3 | 2 ($2^1$) | 0 | EntT + 2 | EntT + 32 + 2 | Trap Processed (count = 0) |
| 4 | 2 | 1 | EntT + 2 | EntT + 32 + 2 | Trap Suppressed |
| 5 | 4 ($2^2$) | 0 | EntT + 4 | EntT + 32 + 4 | Trap Processed (count = 1) |
| 6 | 4 | 1 | EntT + 4 | EntT + 32 + 4 | Trap Suppressed |
| 7 | 4 | 2 | EntT + 4 | EntT + 32 + 4 | Trap Suppressed |
| 8 | 4 | 3 | EntT + 4 | EntT + 32 + 4 | Trap Suppressed |
| 9 | 8 ($2^3$) | 0 | EntT + 8 | EntT + 32 + 8 | Trap Processed (count = 3) |
| 10 | 8 | 1 | EntT + 8 | EntT + 32 + 8 | Trap Suppressed |
| . | | | | | |
| . | | | | | |
| 15 | 8 | 6 | EntT + 8 | EntT + 32 + 8 | Trap Suppressed |
| 16 | 8 | 7 | EntT + 8 | EntT + 32 + 8 | Trap Suppressed |
| 17 | 16 ($2^4$) | 0 | EntT + 16 | EntT + 32 + 16 | Trap Processed (count = 7) |
| 18 | 16 | 1 | EntT + 16 | EntT + 32 + 16 | Trap Suppressed |

Figure 5:
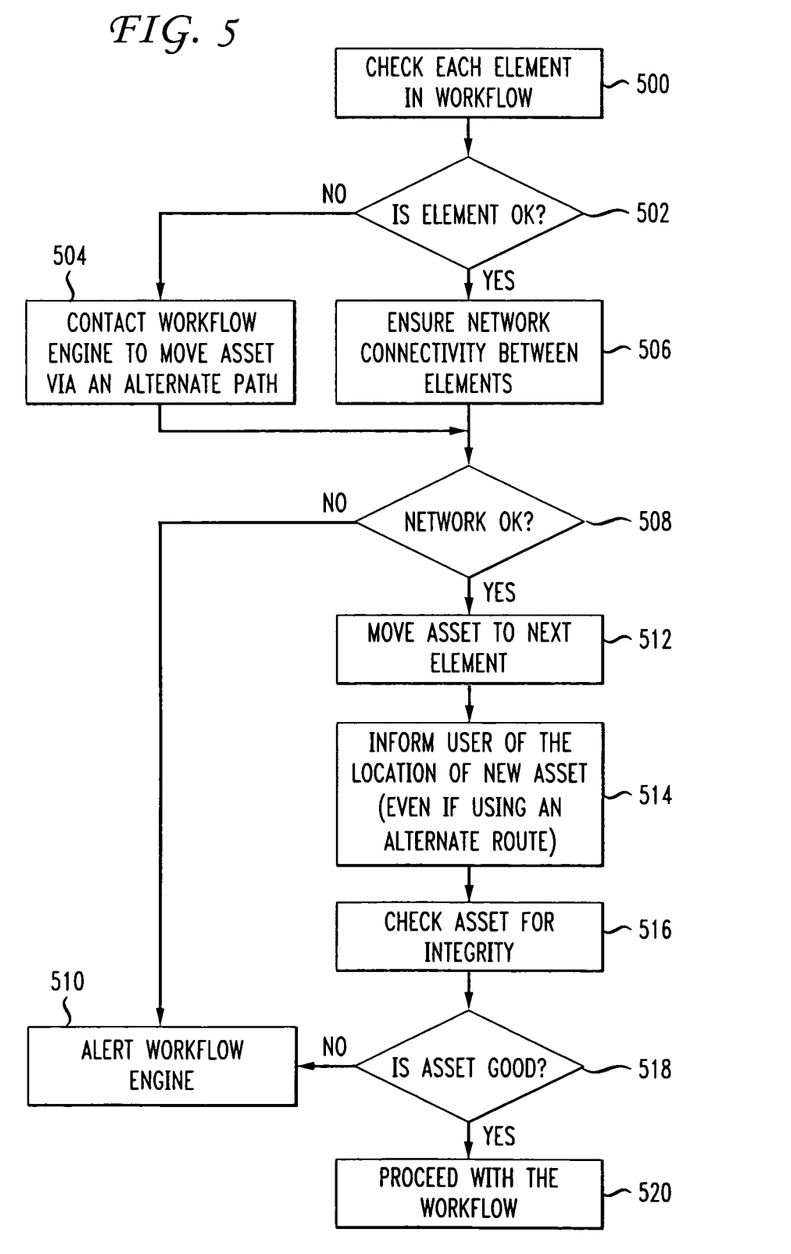
FIG. 5 depicts in flow chart form the steps of a method executed by the monitoring apparatus of FIG. 2 for performing asset tracking.

As discussed previously, the monitoring apparatus 11 of FIG. 1 possess the ability to track assets during content work flow. FIG. 5 depicts in flow chart form the steps of a process for tracking assets during content workflow in accordance with the present principles. The asset tracking process of FIG. 5 commences upon execution of step 500 during which the processor 202 monitors the status of each elements selected for a particular content workflow as determined by the workflow engine 12 of FIG. 1. During step 502, a check occurs to determine if the element is operating properly. If not, the processor 202 of FIG. 1 contacts the workflow 12 engine to move an asset otherwise set for processing by the defective elements during step 504. Otherwise, if the processor 202 finds the checked element operating properly, step 506 occurs during which the processor ensures network conductivity to the next element(s) scheduled to receive the asset during the content work flow. Following either of steps 504 and 506, the processor 202 checks the network linking the elements in the content management system 10 of FIG. 1 during step 508. If the processor 202 finds any part of the network defective during step 508, the processor alerts the workflow engine 12 of FIG. 12 during step 510. Based on the nature of the alert from the received from the processor 202, during step 510 of FIG. 5, the workflow engine 12 can decide to terminate the workflow or proceed with the workflow making use of those element served by that portion of the network still operating properly.

Upon finding the network operating properly during step 508 of FIG. 5, the processor 202 of FIG. 2 alerts the workflow engine 12 of FIG. 1 to move the asset to the next element during step 512. Thereafter, the user receives information during step 514 indicating the new location of the asset, even if the asset traveled via an alternate route, as selected during step 504. Next, during step 516, the asset undergoes an integrity check. If the asset is found to be good during step 518, the content workflow continues during step 520. Otherwise, if the asset is not good, the process proceeds to step 510 during which the workflow engine receives an alarm.

The foregoing describes a technique for managing status information gathered from various elements comprising a content management system. The status information management technique, although described in the context of a content management system, can apply more generally to any system possessing multiple elements.

The invention claimed is:

1. A method of tracking broadcast media assets during a broadcast media content workflow involving at least a subset of a plurality of elements configured to process electronic files comprising audio-visual programs as part of an audio-visual content workflow, the tracking comprising:
   monitoring a status of each element selected for the content workflow, each element comprising a hardware device or software program for performing at least one task associated with receipt, processing, and distribution of broadcast media content;
   determining whether a first element in the content workflow is operating properly in order to process an audio-visual, media asset as part of the content workflow;
   selecting a different element than the first element for processing the media asset when the first element is not operating properly;
   determining whether network connectivity exists to an element scheduled to receive the media asset in the content workflow, the element scheduled to receive the media asset being either the first element or the different element;
   moving the media asset to the element scheduled to receive the media asset and informing a user of the new location of the media asset, when network connectivity exists; and
   alerting a workflow engine when no network connectivity exists to the element scheduled to receive the media asset,
   wherein the element scheduled to receive the media asset in the content workflow processes the media asset by editing the media asset.

2. The method of claim 1, further comprising:
   storing status information from a plurality of elements in a system indexed by element in order of information severity;
   processing the status information in order of information severity for each of the plurality of elements by applying at least one user-specified rule to determine whether to generate an alert for such information when the stored status information matches the at least one user-specified rule; and
   suppressing status information originating from at least one selected element of the plurality of elements.

3. The method of claim 2, wherein the audio-visual content workflow includes receipt, processing, and distribution of electronic files comprising audio-visual programs, and
   wherein the storing status information comprises:
      receiving status information from at least one element in a specific protocol; and
      conforming the status information into a common format.

4. The method of claim 2, further comprising generating an alert when at least a portion of the status information matches the at least one user-specified rule.

5. The method of claim 4, wherein the generating the alert comprises generating a visual alert.

6. The method of claim 2, further comprising generating an alert when at least a portion of the status information matches a plurality of user-specified rules.

7. The method of claim 2, further comprising displaying the stored status information as an automatically generated and updated dashboard, wherein the dashboard comprises one of a dashboard displaying round-trip latency between a given element in the system and selected destinations, a dashboard displaying historic results for a content management system that manages the audio-visual content workflow, and a dashboard that displays critical status information for the plurality of elements.

8. The method of claim 2, wherein the suppressed status information originates from a plurality of selected elements.

9. The method of claim 2, wherein the suppressed status information is selected by a user.

10. The method of claim 2, wherein the suppressed status information is selected by a user from at a plurality of elements.

11. The method of claim 2, wherein the selected status information is suppressed using logarithmic message suppression algorithm.

12. The method of claim 1, further comprising:
   performing an integrity check on the media asset after moving the media asset to the element scheduled to receive the media asset.

13. The method of claim 12, further comprising:
   sending an alarm to the workflow engine upon determining a problem with the media asset during the integrity check.

14. The method of claim 1, further comprising:
   checking a network linking each of the plurality of elements involved in the content workflow; and
   when a portion of the network linking the plurality of elements in the content workflow is determined to be defective, alerting a workflow engine and determining whether to terminate the workflow or to proceed with the workflow using a portion of the network that is operating properly.

15. The method of claim 1, wherein the first element comprises a media asset editor such that the method comprises determining whether the media asset editor in the content workflow is operating properly in order to process an audio-visual asset as part of the media broadcast content workflow and determining whether network connectivity exists from a storage element storing the audio-visual asset to the media asset editor.

16. An apparatus for tracking broadcast media assets during a broadcast media content workflow involving at least a subset of a plurality of elements configured to process electronic files comprising audio-visual programs as part of an audio-visual content workflow, the apparatus comprising:
   means for monitoring a status of each element selected for the content workflow, each element comprising a hardware device or software program for performing at least one task associated with receipt, processing, and distribution of broadcast media content;
   means for determining whether a first element in the content workflow is operating properly in order to process an audio-visual, media asset as part of the content workflow;
   selecting a different element than the first element for processing the media asset when the first element is not operating properly;
   determining whether network connectivity exists to an element scheduled to receive the media asset in the content workflow, the element scheduled to receive the media asset being either the first element or the different element;
   moving the media asset to the element scheduled to receive the media asset and informing a user of the new location of the media asset, when network connectivity exists; and
   alerting a workflow engine, when no network connectivity exists to the element scheduled to receive the media asset, wherein the element scheduled to receive the media asset in the content workflow processes the media asset by editing the media asset.

17. The apparatus of claim 16, further comprising:
means for receiving status information from a plurality of elements in at least two different formats and for conforming the status information into a common format;
means for storing the status information indexed by element in order of information severity;
processor means for processing the stored status information in order of information severity for each of the plurality of elements by applying at least one user-specified rule for generating an alert when the stored status information matches the at least one user-specified rule; and
means for suppressing status information originating from at least one selected element of the plurality of elements.

18. The apparatus of claim 17, further comprising a display for displaying the alert generated by the processor.

19. The apparatus of claim 17, wherein the means for suppressing further comprises:
first means for detecting a trap specifying suppression of status information related to a selected condition; and
second means responsive to the first means for determining whether the stored status information includes the status information related to the selected condition and deleting the status information related to the selected condition when stored status information includes the status information related to the selected condition.

20. The apparatus of claim 16, further comprising:
means for performing an integrity check on the media asset after moving the media asset to a next element.

\* \* \* \* \*